March 12, 1929.  W. C. ARMISTEAD  1,705,105
DISPENSING PUMP
Filed Jan. 26, 1925  3 Sheets-Sheet 3

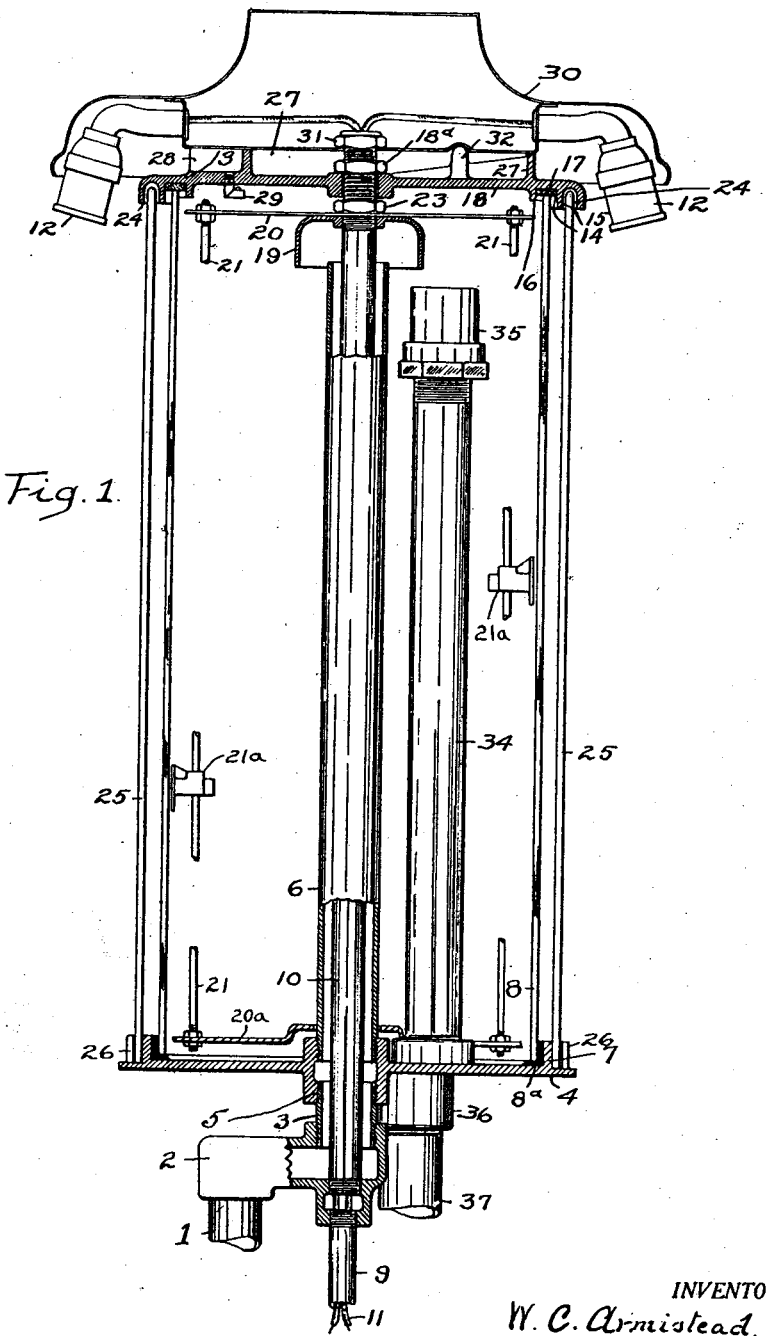

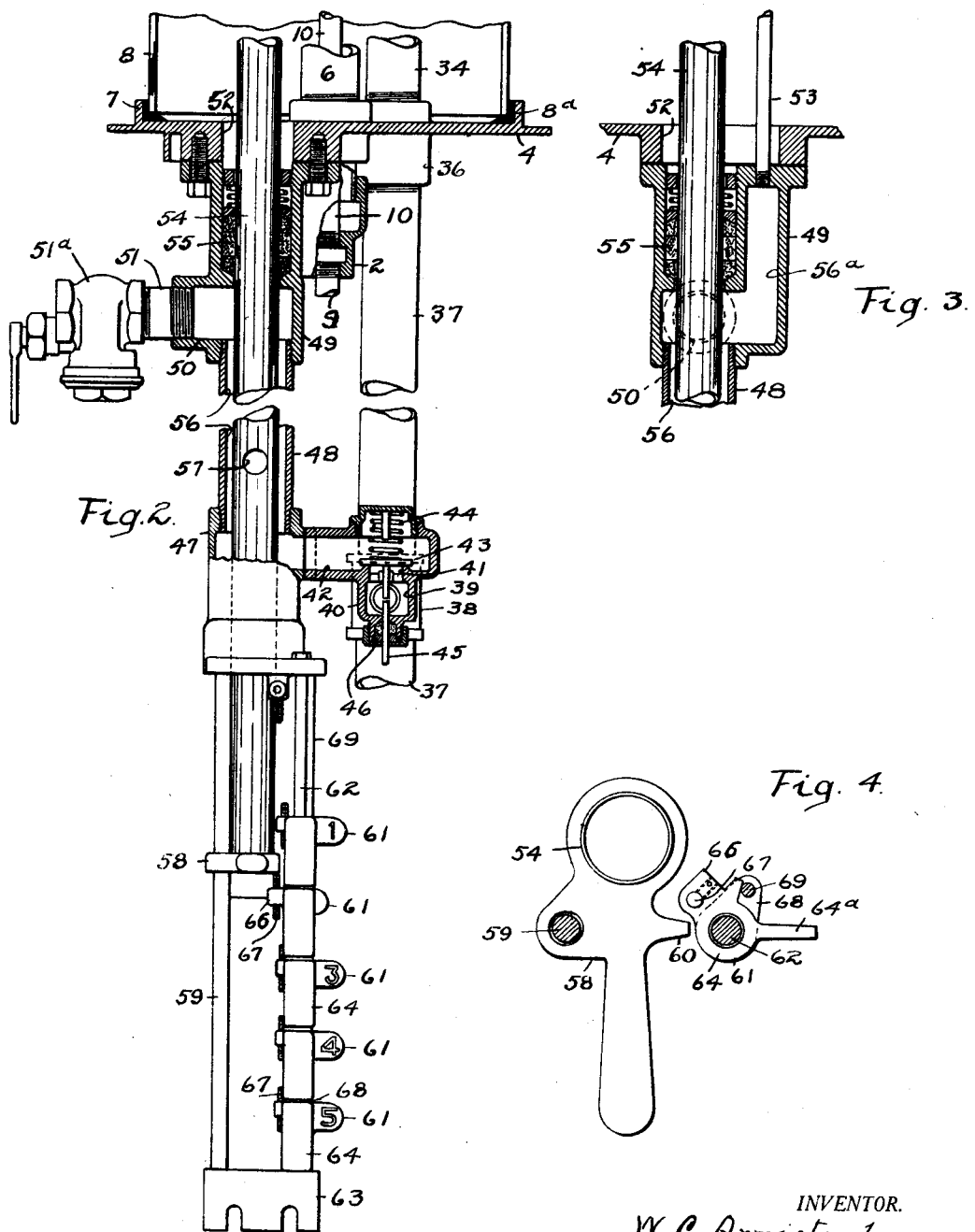

INVENTOR.
W. C. Armistead
BY
ATTORNEY.

Patented Mar. 12, 1929.

1,705,105

UNITED STATES PATENT OFFICE.

WILLIAM C. ARMISTEAD, OF LA CROSSE, WISCONSIN, ASSIGNOR TO S. F. BOWSER & COMPANY, OF FORT WAYNE, INDIANA, A CORPORATION.

DISPENSING PUMP.

Application filed January 26, 1925. Serial No. 4,652.

The invention relates to liquid dispensing pumps wherein the liquid is pumped into a receptacle from which it discharges by gravity in predetermined measured quantities.

An object of the invention is to provide a simple compact and efficient mechanism by which oil and other liquids may be dispensed in measured quantities.

Another object is to provide a pump mechanism with a novel discharge means by which liquid may be dispensed in predetermined quantities.

Another object is to provide a novel form of measuring receptacle of the visible type and novel means for mounting the same.

Other objects and advantages will appear hereinafter.

Figure 5:
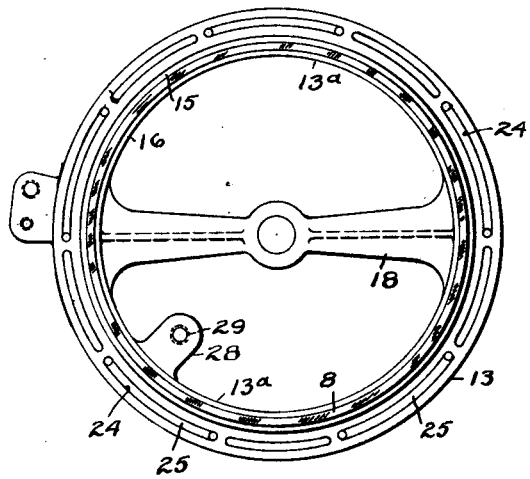
Figure 6:
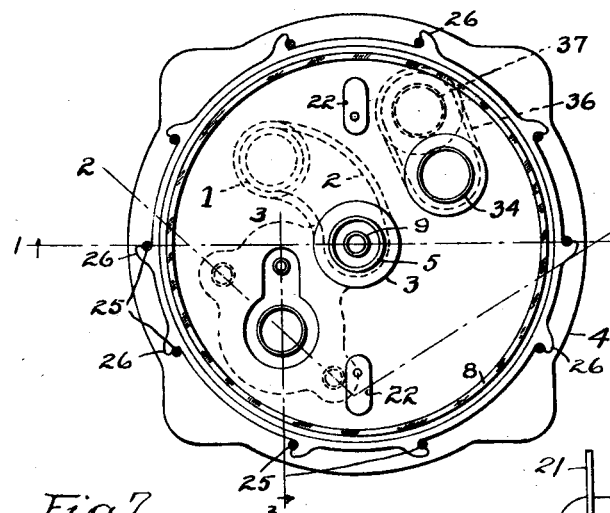
Figure 8:
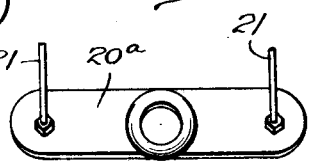
Figure 7:
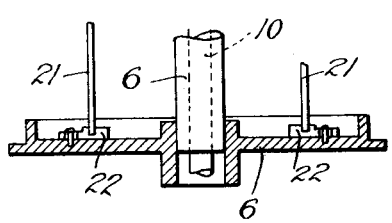

The invention consists in certain novel features of construction, combination and arrangement of parts hereinafter described and illustrated in the accompanying drawings in which Figure 1 is a vertical sectional view of the measuring receptacle or bowl, taken on the line 1—1 of Fig. 6; Fig. 2 an elevational view partly in section of the discharge mechanism, the sectional portion being taken on line 2—2 of Fig. 6; Fig. 3 a vertical sectional view of the discharge outlet and tube taken on line 3—3 of Fig. 6; Fig. 4 a plan view of the sliding discharge tube and one of the stops; Fig. 5 a bottom plan view of the top of the measuring receptacle; Fig. 6 a top plan view of the base of the measuring receptacle showing a modified mechanism for carrying the indicating pointers, the latter being at right angles to those shown in Figure 1; Fig. 7 a central cross-section of the base and Fig. 8 a perspective view of the indicator carrying mechanism.

In the illustrative embodiment of the invention the parts shown in Figs. 1 and 2 constitute a vertically disposed unit, the parts in Fig. 2 being enclosed by a suitable case, not shown, having doors at desirable points to afford access to the parts.

1 is the supply or fill pipe which leads from a suitable storage tank or from a pump connected to the tank and is connected at its upper end to a conduit or passageway 2 that is attached by a connection 3 to the base 4 of the measuring receptacle, at an opening 5 in said base. A pipe 6 is also threaded in said opening 5 and extends upwardly within the measuring receptacle.

An annular flange 7 projects upwardly from the base adjacent its outer edge and a glass cylinder 8 is engaged on the base within the flange, a fluid tight joint between the cylinder and the base and the flange being formed by suitable means, such as litharge, 8ª.

A conduit 9 extends upwardly from the ground and is connected at its upper end to the casting which forms the conduit or passageway 2, a second conduit 10 being connected to the casting above and in alinement with the conduit 9 and being extended through the connection 3 and through the extension 6 of the fill pipe. The conduit 10 projects from the upper end of the pipe 6 and is exteriorly threaded. The conduits 9 and 10 contain the wires 11 by which electric current is supplied to illuminate the lamps mounted in the sockets 12.

A cap ring 13 rests upon the upper edge of the cylinder 8, the upper end of the cylinder being received in a channel 14 formed in the cap by the annular flanges 15 and 16. Suitable means 17, such as cork or litharge is disposed between the end of the cylinder and the cap ring. A rib 18 extends centrally across the ring and is in engagement with the conduit 10, and a nut 18ª on the conduit when tightened on the rib 18 secures the ring in position after the ring is tightened on the cylinder. The open spaces 13ª on opposite sides of the rib afford access to the interior of the receptacle without removing the cap ring.

A cup-shaped cover 19 is threaded on the conduit 10 and is positioned thereon so that its rim lies in a plane below the horizontal plane of the upper edge of the supply pipe 6. When liquid is pumped through the supply pipe it discharges from the upper end of the pipe 6 and strikes the cover by which it is deflected downwardly into the receptacle.

Bearing against the top of the cover 19 and engaged on the conduit 10 is a bar or plate 20 to the outer ends of which are secured the rods 21. The lower ends of the rods are engaged in a plate 20ª loosely engaged on the fill pipe 6 or said ends may engage sockets 22 formed in the base 4 (Fig.

6). These rods support pointers 21ª by which quantities of liquid are indicated in the receptacle, such as 1, 2, 3, 4 and 5 gallons. A nut 23 on the conduit 10 holds the plate 20 in position, and the nut lies below the central boss of the rib 18.

A plurality of grooves 24 formed in the bottom of the ring 13 (Fig. 5) receive the upper ends of the U-shaped spring members 25. The lower ends of each member 25 are engaged behind the lugs 26 that project from the upper side of the base 4. Each member 25 is installed by engaging its upper closed end in one of the grooves 24 and then its lower ends are spread to pass beyond the lugs 26. Upon releasing the said ends they spring into engagement with the lugs and they are therefore rigidly supported between the cap ring and the base. These members support any suitable guard for protecting the glass cylinder but do not tie the cap ring on the cylinder. The conduit 10 performs the tieing function alone.

The annular flange 27 projects upwardly from the top side of the cap ring, the flange being inset at one point to form a passageway 28 for venting the receptacle. A short pipe 29 is threaded in an opening formed in the cap ring at the passageway and forms a communication between the interior of the receptacle and the passageway 28, a suitable check valve being mounted in the pipe to control the same.

A canopy 30 is engaged on the flange 27 and firmly held in position by a nut 31. Rotation of the canopy is avoided by the engagement of a lug 32 in a recess formed in the bottom of the canopy, the lug being formed on the rib 18.

The service wires 11 are extended through a side wall of the canopy and are suitably connected to the lamp sockets 12 that are supported on said wall.

An overflow pipe 34 is mounted in the base 4 and extends upwardly within the receptacle. A sleeve 35 is threaded on the upper end of this pipe by which the effective height of the pipe may be increased or decreased in order to secure an accurate measurement of the maximum amount of liquid the receptacle shall contain. At its lower end the pipe 34 communicates with a passageway 36 (Fig. 6), formed in the base 4 and a conduit 37 also communicates with this passageway and leads to the main reservoir or storage tank from which liquid is pumped.

When liquid is pumped into the receptacle through the fill pipe 6, it will rise therein until it reaches the upper rim of the adjustable sleeve on the overflow pipe. It usually passes above said rim and after the pump ceases operating, it overflows through the pipe 34 back to the storage tank until it reaches the level determined by the sleeve 35. This level indicates a predetermined quantity of liquid in the receptacle, or bowl as it is commonly designated.

At a suitable point in the conduit 37 there is attached a connection 38 which communicates with a chamber 39 formed in the casting 40. A port 41 in a wall of the casting forms a communication between the chamber 39 and a passageway 42 in the casting. A valve 43 normally closes this port under the influence of a spring 44, and its stem 45 projects through a suitable stuffing box 46 to the exterior of the casting for manipulation to unseat the valve when desired. The casting 40 is suitably removably attached to a hollow casting 47, and the passageway 42 communicates with the interior of the casting 47. A vertical pipe 48 is connected at its lower end to the casting 47 and its upper end is connected to casting 49 secured to and depending from the base 4 and having a discharge conduit 50 with which a pipe 51 communicates, a suitable discharge means such as a hose being attached to the pipe. A controlling valve 51ª is installed in the pipe 51. A port 52 in the base 4 forms a communication between the casting 49 and the interior of the receptacle. A vent pipe 53 (Fig. 3) is also connected to the casting 49 and extends up through the port 52 toward the upper end of the receptacle.

A tube 54 is longitudinally slidably mounted in the casting 47 and is extended up through the pipe 48 and the casting 49, a stuffing box 55 being provided in the latter casting to prevent leakage of liquid around the tube. The tube is less in diameter than the pipe 48 hence a passageway or well 56 is formed by the pipe and the casting 47 with which the tube has communication by the ports 57 formed in the wall of the tube. A stuffing box is provided in the casting 47 for the tube or a member connected to the lower end of the tube.

A handle 58 (Fig. 4) is suitably connected to the tube 54 by which the tube may be raised or lowered by hand. A fixed guide rod 59 slidably embraced by the handle prevents rotation of the tube. A lug 60 projects laterally from the handle and is adapted to abut any one of the quantity stops 61 when placed in its path. The tube is of such length that it may be elevated into the bowl to drain out liquid therefrom down to any level between the upper end of the overflow pipe and the bottom of the receptacle.

The stops are mounted on a rod 62 fixed to the casting 47 and to the foot 63, the guide rod 59 being secured to the same casting and foot. Each stop comprises a sleeve 64 having a laterally projecting lug 64ª, preferably at its upper end, upon one face of which is formed or placed a number indicating quantity. A lug 66 projects from the opposite side of the sleeve at a proper angle and carries a screw member 67 that is vertically adjustable on the lug. The screw member is so adjusted that when the handle abuts the upper end of the screw member the upper end of the tube will be at the correct level in the bowl to cause the selected quantity of liquid to discharge from the bowl. In the present illustration the stops are numbered from 1 to 5, representing gallons, the uppermost stop being numbered 1. In Fig. 2 the second stop has been operated and the handle engages the screw member on the stop; hence two gallons of liquid will flow from the bowl through the tube into the annular space or well 56 and out through the discharge 51.

Each stop is separated from its neighbor by a flat washer 68, and a rod 69 secured to the casting 47 and to the foot 63 is passed through each of the washers to prevent its rotation when a stop is turned. Hence when one of the stops is turned or set in operating position the other stops are undisturbed.

In operation the discharge tube 54 is raised to its highest point; that is; slightly below the upper end of the overflow pipe 34, and the liquid to be dispensed is forced by the pump, or such other source of power as may be used, from the storage tank through the fill pipes 1 and 6 into the measuring receptacle or bowl. The selected stop is then rotated or turned to cause its lug 66 to move into the path of the lug 60 on the handle and the tube is then lowered until the lug 60 abuts the bolt on the lug 66. The valve in the discharge pipe is then opened and the liquid discharges through the sliding tube, the annular cavity or well and the discharge pipe to the desired point. When the level of the liquid in the receptacle falls to the top of the sliding tube the flow of the liquid from the receptacles ceases and the quantity of liquid that has passed into the discharge pipe and received by the customer is the quantity indicated by the selected stop. The liquid in the cavity 56ª of the casting 49 is discharged at each discharging operation of the mechanism, and hence is part of that received by the customer or operator. In order that this cavity shall be filled upon each refilling operation, the pipe 53 vents the cavity thereby avoiding all air binding of the same and assures the delivery of the predetermined quantity of liquid at each operation of the mechanism. The several parts are of course properly proportioned and adjusted so that an accurate measure of liquid is assured. The operations are repeated as often as liquid is desired. After the first operation of the pump in the day it is not essential to drain the measuring receptacle if the contents are not all dispensed at that operation, but fire regulations may require such drainage. The surplus liquid in the receptable, in the discharge tube and in the annular cavity and the passageway may be drained out by opening the valve 43. The liquid then flows through the port 41 into the cavity 39 and into the return pipe 37 by which it is conducted back to the storage tank. Doors are provided on the casing which encloses the operating parts of the mechanism so that unauthorized access to the parts may be prevented and one of these doors could be operatively connected to the stem of the drain valve 43 by which the closing of the door will cause the drain valve to open. This is general practice now and I do not illustrate it.

What I claim is:

1. In a liquid dispensing mechanism, the combination of a base, a transparent cylinder on the base, a fill pipe within the cylinder and extending upwardly from the base, a conduit extending through the fill pipe, an apertured cap clamped on the upper end to provide access to the interior of the cylinder, a canopy, and movable means on the conduit to clamp the canopy upon the top side of the cap for closing the apertures in the cap.

2. In a liquid dispensing mechanism, the combination of a base, a transparent cylinder on the base, a fill pipe within the cylinder and secured in an opening in the base, a conduit extending upwardly through the said opening and through the fill pipe, a guard mounted on the conduit and overhanging the upper end of the fill pipe and adapted to direct liquid flowing from the fill pipe in an outward and downward direction, an apertured cap on the conduit and secured upon the upper end of the cylinder and adapted to afford access to the interior of the cylinder, the cap also having a passageway therein communicating with the interior of the cylinder and with the atmosphere, a valve to control the said passageway, a canopy removably covering the cap and means on the conduit to clamp the canopy on the cap.

3. In a liquid dispensing mechanism the combination of a base, a transparent cylinder on the base, a series of lugs on the base exteriorly of the cylinder, a cap removably clamped upon the upper end of the cylinder and having a series of grooves formed in its lower face and exteriorly of the cylinder and a plurality of U-shaped members engaged in the grooves respectively, their lower ends having resilient engagement with the lugs.

4. In a liquid dispensing mechanism, the combination of a base, a transparent cylinder on the base, a support within the cylinder and extending upwardly from the base, an apertured member on the support and engaging the upper end of the cylinder, means to lock the said member on the cylinder, a canopy to close the apertured member and removable means on the support to clamp the canopy in engagement with the apertured member.

5. In a liquid dispensing mechanism, the combination of a base, a transparent cylinder on the base, a support within the cylinder and projecting upwardly from the base, a member engaging the upper end of the cylinder and having annular grooves in its lower side exteriorly of the cylinder, means on the support to lock the member on the cylinder, and resilient members removably engaged in the grooves and engaging the base.

In witness whereof I have hereunto subscribed my name this 16th day of January, 1925.

WILLIAM C. ARMISTEAD.